United States Patent
Yaegashi et al.

(10) Patent No.: US 8,008,627 B2
(45) Date of Patent: Aug. 30, 2011

(54) RADIATION IMAGING ELEMENT

(75) Inventors: Hiroyuki Yaegashi, Kanagawa (JP); Masaya Nakayama, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 232 days.

(21) Appl. No.: 12/204,582

(22) Filed: Sep. 4, 2008

(65) Prior Publication Data

US 2009/0078877 A1 Mar. 26, 2009

(30) Foreign Application Priority Data

Sep. 21, 2007 (JP) ................................. 2007-246052
Jun. 16, 2008 (JP) ................................. 2008-156640

(51) Int. Cl.
*G01T 1/24* (2006.01)

(52) U.S. Cl. ................................. 250/370.08
(58) Field of Classification Search ............... 250/370.08
See application file for complete search history.

(56) References Cited

U.S. PATENT DOCUMENTS

| | | | | |
|---|---|---|---|---|
| 6,410,411 | B1 * | 6/2002 | McGarvey et al. | 438/592 |
| 7,233,003 | B2 * | 6/2007 | Watadani et al. | 250/370.08 |
| 7,408,169 | B2 * | 8/2008 | Ishii et al. | 250/370.14 |
| 7,521,684 | B2 * | 4/2009 | Nomura et al. | 250/370.09 |
| 7,560,700 | B2 * | 7/2009 | Imai | 250/370.08 |
| 7,576,327 | B2 * | 8/2009 | Okada | 250/370.09 |
| 7,728,299 | B2 * | 6/2010 | Irisawa et al. | 250/370.08 |
| 2002/0079493 | A1 * | 6/2002 | Morishita | 257/72 |
| 2002/0145117 | A1 * | 10/2002 | Mochizuki | 250/370.09 |
| 2003/0010899 | A1 * | 1/2003 | Ishii et al. | 250/214.1 |
| 2003/0168604 | A1 * | 9/2003 | Nomura et al. | 250/370.11 |
| 2003/0218589 | A1 * | 11/2003 | Watanabe et al. | 345/87 |
| 2003/0226974 | A1 * | 12/2003 | Nomura et al. | 250/370.11 |
| 2007/0090365 | A1 * | 4/2007 | Hayashi et al. | 257/72 |

FOREIGN PATENT DOCUMENTS

| | | |
|---|---|---|
| JP | 8-116044 A | 5/1996 |
| JP | 2006-165529 A | 6/2006 |
| JP | 2006-165530 A | 6/2006 |

OTHER PUBLICATIONS

English translation of JP 2006-165529.*
IDW/AD'05, pp. 845-846 (Dec. 6, 2005).
Nature, vol. 432, pp. 488-492 (Nov. 25, 2004).

* cited by examiner

*Primary Examiner* — David P Porta
*Assistant Examiner* — Djura Malevic
(74) *Attorney, Agent, or Firm* — Birch, Stewart, Kolasch & Birch, LLP

(57) ABSTRACT

A radiation imaging element that includes a plurality of pixel portions each having a phosphor layer that absorbs radiation transmitted through a subject to emit light, a photoelectric conversion portion that includes an upper electrode, a lower electrode, and a photoelectric conversion layer disposed between the upper electrode and the lower electrode, and a TFT which outputs a signal corresponding to an electric charge generated in the photoelectric conversion layer, wherein the TFT includes at least a gate electrode, a gate insulating layer, an active layer, a source electrode and a drain electrode, and an electric insulating layer is further provided so as to be electrically connected between the active layer and at least one of the source electrode or the drain electrode.

13 Claims, 2 Drawing Sheets

## RADIATION IMAGING ELEMENT

CROSS REFERENCE TO RELATED APPLICATION

This application claims priority under 35 USC 119 from Japanese Patent Application Nos. 2007-246052 and 2008-156640, the disclosures of which are incorporated herein by reference.

BACKGROUND OF THE INVENTION

1. Field of the Invention

The present invention relates to a radiation imaging element, specifically, a radiation imaging element that outputs an image signal corresponding to an amount of radiation transmitted through a subject.

2. Description of the Related Art

In the medical field, a radiation imaging apparatus is used, wherein radiation such as X-rays or the like is irradiated to a human body to detect an intensity of radiation transmitted through a human body, whereby an image of an interior of the human body is obtained. The radiation imaging apparatus is broadly classified into a direct type imaging apparatus and an indirect type imaging apparatus. In the direct type imaging apparatus, radiation transmitted through a human body is directly converted to an electrical signal to be externally extracted. In the indirect type imaging apparatus, radiation transmitted through a human body is first made to be incident on a phosphor and converted into visible light, and thereafter the visible light is converted to an electrical signal to be externally extracted.

As a radiation imaging element that is used in an indirect type imaging apparatus, an X-ray imaging element having a photoelectric conversion element, a capacitor and a TFT (switching element) disposed in the same layer structure on a substrate is proposed in Japanese Patent Application Laid-Open (JP-A) No. 08-116044. In the radiation imaging element, for each of pixels, a pair of an upper electrode and a lower electrode, a photoelectric conversion portion disposed between the two electrodes, and containing a photoelectric conversion layer constituted of an inorganic photoelectric conversion material such as amorphous silicon, a capacitor for storing electric charges generated in the photoelectric conversion layer, and a TFT switch that converts the electric charges stored in the capacitor to a voltage signal for output are formed side by side on a substrate, and further thereon, a phosphor made of cesium iodide (CsI) is disposed through an intervening protective layer (SiN layer).

On the other hand, to make the element thinner, lighter, and more resistant to breakage, attempts are being made to use a resin substrate, which is light in weight and flexible, instead of a glass substrate.

However, fabrication of the transistors using thin films of silicon described above requires a thermal treatment process at a relatively high temperature, and it is difficult to form the transistors directly on a resin substrate which is generally low in heat resistance.

Hence, such TFTs have been actively developed using, as a semiconductor thin film, a film of an amorphous oxide, such as an In—Ga—Zn—O-based amorphous oxide, which can be formed at a low temperature, as disclosed in JP-A No. 2006-165529 and IDW/AD'05, pages 845-846 (Dec. 6, 2005).

As the films for a TFT made with an amorphous oxide semiconductor can be formed at room temperature, the TFT can be prepared on a film (flexible substrate). Therefore, amorphous oxide semiconductors have been attracting attention as a material for active layers of film (flexible) TFTs lately. Particularly, Prof. Hosono et al. of the Tokyo Institute of Technology have reported that a TFT formed using a-IGZO has a field effect mobility of about 10 $cm^2$/Vs even on a PEN substrate, which is higher than that of an a-Si TFT on glass. Since then, TFTs formed using an amorphous oxide semiconductor have especially drawn attention, especially as film TFTs (see for example, NATURE, vol. 432, pages 488-492, Nov. 25, 2004.).

From such viewpoints, JP-A No. 2006-165530 discloses an X-ray sensor which includes a TFT having an amorphous oxide on a flexible substrate as a light-receiving part.

However, in the case of using, as for example, a drive circuit of a display, a TFT formed using a-IGZO, there are problems in that mobility ranges from 1 $cm^2$/Vs to 10 $cm^2$/Vs, which provides insufficient performance, the OFF current is high, and the ON-OFF ratio is low. Particularly, in order to apply such a TFT to a display incorporating an organic EL device, farther increase in mobility and improvement in ON-OFF ratio are required.

SUMMARY OF THE INVENTION

The present invention has been made in view of the above circumstances and provides a radiation imaging element with the following aspect.

An aspect of the invention provides a radiation imaging element that receives radiation transmitted through a subject and outputs an image signal corresponding to an amount of the radiation, wherein the radiation imaging element comprises a plurality of pixel portions each comprising:

a photoelectric conversion portion having a lower electrode formed on a substrate, a photoelectric conversion layer formed on the lower electrode, and an upper electrode formed on the photoelectric conversion layer;

a phosphor layer formed on the upper electrode; and a field-effect transistor provided at the substrate so as to correspond to the photoelectric conversion portion, for outputting the image signal corresponding to an electric charge generated in the photoelectric conversion layer, wherein the field-effect transistor includes at least a gate electrode, a gate insulating layer, an active layer, a source electrode and a drain electrode, and an electric resistance layer is provided so as to be electrically connected between the active layer and at least one of the source electrode or the drain electrode.

DETAILED DESCRIPTION OF THE INVENTION

Figure 1:
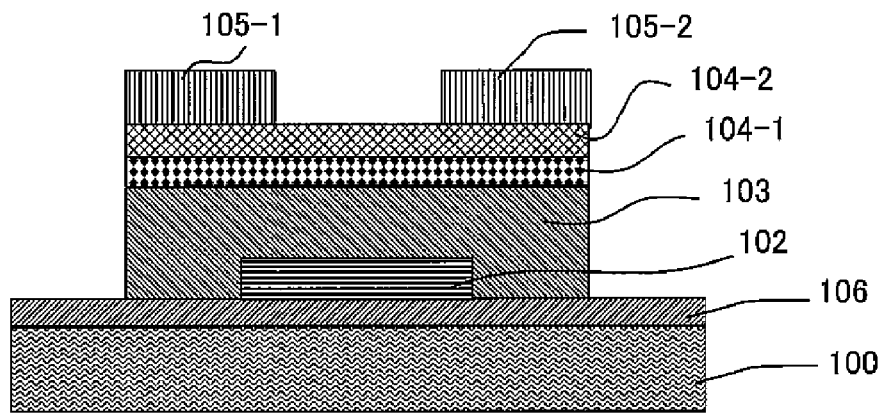
FIG. 1 is a schematic sectional view showing the structure of a field-effect transistor used in an embodiment of the present invention.

In the case where a photoelectric conversion layer of a radiation imaging element is constituted of an inorganic photoelectric conversion material such as silicon, owing to a broad absorption spectrum thereof, other than light emitted from a phosphor, X-rays transmitted through the phosphor are partially absorbed. As a result, there is a problem in that a signal corresponding to the absorbed X-rays becomes noise to deteriorate image quality.

Furthermore, in the case where a layer configuration of a photoelectric conversion portion and a layer configuration of a switching element are made to be common with each other, and the photoelectric conversion portion and the switching element are disposed side by side, a signal corresponding to X-rays becomes noise in the switching element as well as in the photoelectric conversion portion.

Furthermore, in general, in a radiation imaging element, a light-receiving area (an area occupied by a photoelectric conversion layer) is necessarily set equivalent to a magnitude of, for instance, a chest of a human body, that is, a light-receiving area is demanded to be large. However, as in the radiation imaging element described above, wherein a photoelectric conversion portion, a capacitor and a TFT switch are disposed side by side on a substrate, there is a problem in that a region occupied by a switching element and a capacitor becomes large in each of the pixel portions, and although an area per pixel is large, a light-receiving area that corresponds to a photoelectric conversion portion becomes small, and therefore, high image quality is not obtained as a whole. In another case wherein a capacitor and a TFT switch are disposed longitudinally with respect to the photoelectric conversion portion on a substrate, a wider light-receiving area corresponding to a photoelectric conversion portion can be obtained, but a total area of the capacitor and the TFT switch is necessarily set equal to or less than an area of the photoelectric conversion portion, which results in a reduction in output of the TFT switch. Therefore, a problem occurs in that a necessary switching function cannot be obtained.

The present invention has been made in view of the above circumstances and provides a radiation imaging element which effectively inhibits noise, and also achieves a higher image quality.

The present invention provides the following radiation imaging element in order to attain the objects described above.

A radiation imaging element of the present invention is a radiation imaging element that receives radiation transmitted through a subject and outputs an image signal corresponding to an amount of the radiation, wherein the radiation imaging element includes a plurality of pixel portions each including a photoelectric conversion portion having a lower electrode formed on a substrate, a photoelectric conversion layer formed on the lower electrode, and an upper electrode formed on the photoelectric conversion layer, a phosphor layer formed on the upper electrode, and a field-effect transistor provided at the substrate so as to correspond to the photoelectric conversion portion, for outputting the image signal corresponding to an electric charge generated in the photoelectric conversion layer, in which the field-effect transistor includes at least a gate electrode, a gate insulating layer, an active layer, a source electrode and a drain electrode, and an electric resistance layer is provided so as to be electrically connected between the active layer and at least one of the source electrode or the drain electrode.

Preferably, at least the active layer and the electric resistance layer are laminated on the substrate, the active layer is in contact with the gate insulating layer, and the electric resistance layer is in contact with at least one of the source electrode or the drain electrode.

Preferably, the electric resistance layer is thicker than the active layer.

Preferably, an electric conductivity continuously changes between the electric resistance layer and the active layer in the active layer.

Preferably, the active layer and the electric resistance layer include an oxide semiconductor. Preferably, the oxide semiconductor is an amorphous oxide semiconductor.

Preferably, the active layer has an oxygen concentration lower than that of the electric resistance layer.

Preferably, the oxide semiconductor includes at least one material selected from the group consisting of indium, gallium and zinc, or a composite oxide thereof.

More preferably, the oxide semiconductor includes indium and zinc, and a composition ratio of zinc (Zn) to indium (In), i.e., Zn/In, in the electric resistance layer is larger than that in the active layer.

Preferably, the electric conductivity of the active layer is $10^{-4}$ Scm$^{-1}$ or more, and less than $10^{2}$ Scm$^{-1}$. More preferably, the electric conductivity of the active layer is $10^{-1}$ Scm$^{-1}$ or more, and less than $10^{2}$ Scm$^{-1}$.

Preferably, a ratio of the electric conductivity of the active layer to the electric conductivity of the electric resistance layer (i.e., electric conductivity of active layer/electric conductivity of electric resistance layer) is from $10^{1}$ to $10^{10}$, and more preferably, from $10^{2}$ to $10^{8}$.

Preferably, the substrate is a flexible resin substrate.

According to the present invention, a radiation imaging element which effectively inhibits noise and also achieves a higher image quality is provided.

In the following, an embodiment of the present invention is to be described with reference to the drawings.

Figure 4:
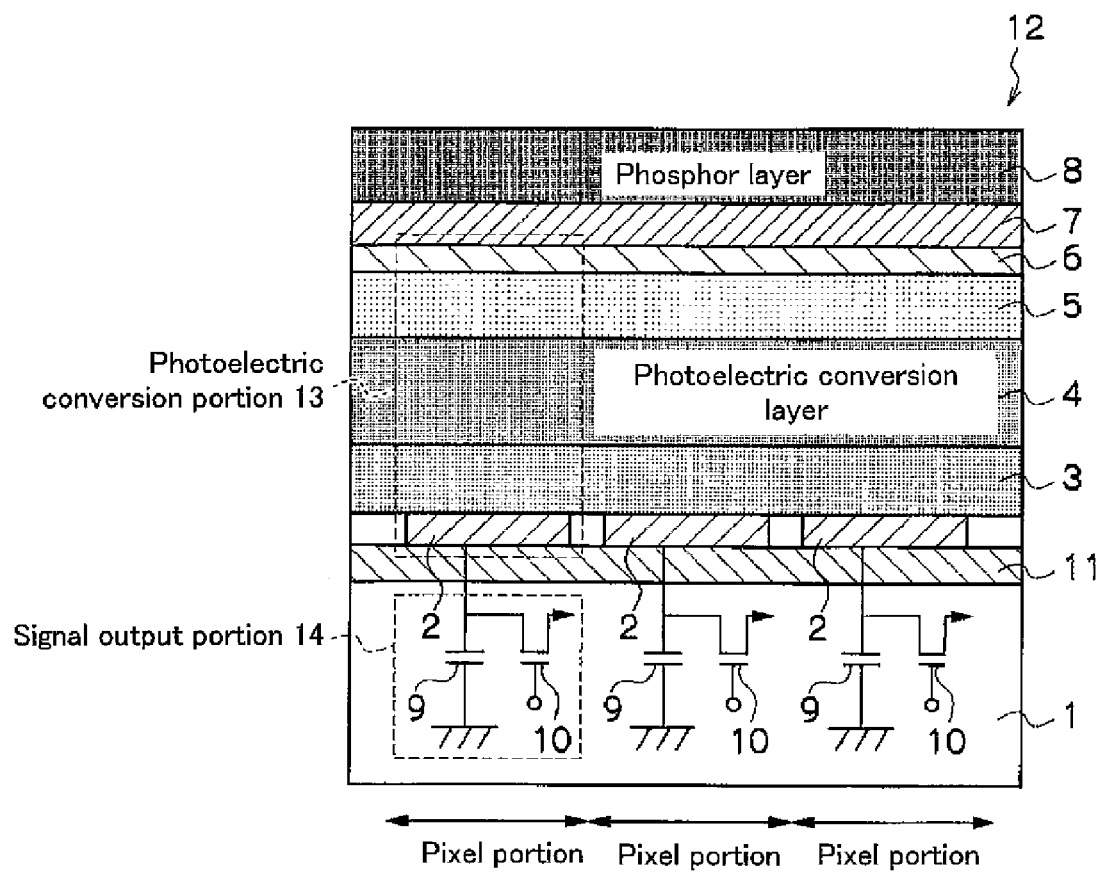
FIG. 4 is a schematic sectional view showing a configuration of three pixel portions of a radiation imaging element according to an embodiment of the present invention.
Figure 5:
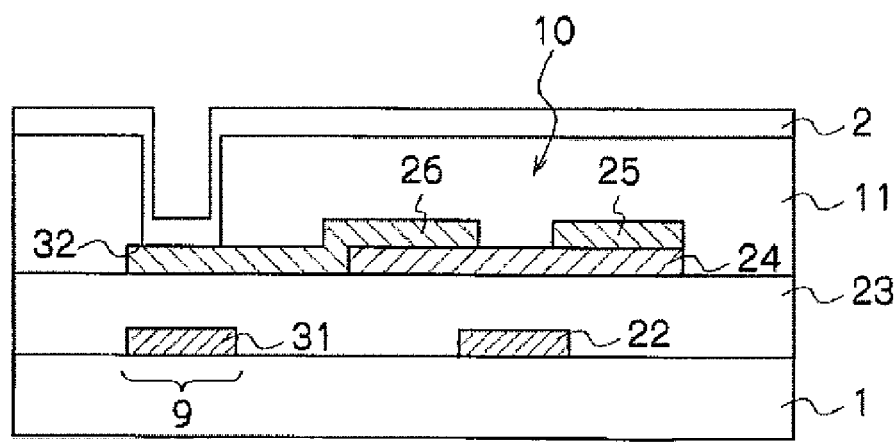
FIG. 5 is a schematic sectional view showing a configuration of a signal output portion of one pixel portion.

FIG. 4 is a schematic sectional view showing a configuration of three pixel portions of a radiation imaging element according to the embodiment of the invention. A radiation imaging element 12 is formed by laminating a signal output portion 14, a photoelectric conversion portion 13 and a phosphor layer 8 sequentially on a substrate 1 such as a semiconductor substrate, a quartz substrate or a glass substrate, and a pixel portion is constituted of the signal output portion 14, the photoelectric conversion portion 13 and the phosphor layer 8. The pixel portion is plurally arranged on the substrate 1 and the signal output portion 14 and photoelectric conversion portion 13 in each of the pixel portions are constituted so as to have overlapping.

<Phosphor Layer>

The phosphor layer 8 is formed on the photoelectric conversion portion 13 through an intervention of a transparent insulating film 7, and formed by layering a phosphor that converts radiation incident from an upper side (a side opposite to the substrate 1) to light, which is emitted. Owing to the phosphor layer 8 disposed in such the way, radiation transmitted through a subject is absorbed to emit light.

A wavelength region of light that the phosphor layer 8 emits is preferably in a range of the visible light region (wavelengths: from 360 nm to 830 nm). In order to realize monochromatic imaging by the radiation imaging element 12, a green wavelength region is preferably contained.

In the case where X-ray is used as the radiation for imaging, specific examples of the phosphor used in the phosphor layer 8 preferably include a phosphor containing cesium iodide (CsI), and particularly preferably CsI (Ti) (titanium added cesium iodide) that shows an emission spectrum in a range of from 420 nm to 600 nm by irradiation of X-ray. A peak emission wavelength in the visible light region of CsI (Ti) is 565 μm.

Furthermore, a thickness of the phosphor layer 8 is, though depending on energy, 600 μm or less.

<Photoelectric Conversion Portion>

A photoelectric conversion material applied in the present invention is not limited to specific materials, but, for example, an organic photoelectric conversion material may be explained.

The photoelectric conversion portion 13 includes an upper electrode 6, a lower electrode 2 and a photoelectric conversion layer 4 disposed between the upper electrode and the lower electrode, and the photoelectric conversion layer 4 is constituted of an organic photoelectric conversion material that absorbs light emitted from the phosphor layer 8.

As light generated in the phosphor layer 8 has to be incident on the photoelectric conversion layer 4, the upper electrode 6 is preferably constituted of an electrically conductive material which is transparent at least with respect to an emission wavelength of the phosphor layer 8, and specifically, a transparent electrically conductive oxide (TCO) that is high in transmissivity to visible light and low in electric resistance is preferably used. As the upper electrode 6, a thin film of metal such as Au may be used, but in order to obtain the transmittance of 90% or more with Au, an electric resistance value tends to increase. Therefore, TCO is preferred. For instance, ITO, IZO, AZO, FTO, $SnO_2$, $TiO_2$ or ZnO is preferably used, and from the viewpoints of the process simplicity, low electric resistance and transparency, ITO is most preferred. The upper electrode 6 may be formed in one sheet common over an entire pixel portion or may be divided for the respective pixels.

Furthermore, a thickness of the upper electrode 6 can be set at, for instance, 30 nm or more and 300 nm or less.

The photoelectric conversion layer 4 contains an organic photoelectric conversion material, absorbs light emitted from the phosphor layer 8 and generates electric charges corresponding to the absorbed light. The photoelectric conversion layer 4 containing an organic photoelectric conversion material has a sharp absorption spectrum in the visible light region, and hardly absorbs an electromagnetic wave other than light emitted by the phosphor layer 8, and thereby, noise generated when radiation such as X-rays is absorbed by the photoelectric conversion layer 4 is effectively inhibited from occurring.

In the organic photoelectric conversion material that constitutes the photoelectric conversion layer 4, in order to most efficiently absorb light emitted from the phosphor layer 8, the closer an absorption peak wavelength thereof is to an emission peak wavelength of the phosphor layer 8, the more preferred. It is ideal that an absorption peak wavelength of an organic photoelectric conversion material and an emission peak wavelength of the phosphor layer 8 coincide. However, when the difference therebetween is small, it is possible that light emitted from the phosphor layer 8 is sufficiently absorbed. Specifically, the difference between an absorption peak wavelength of the organic photoelectric conversion material and an emission peak wavelength of the phosphor layer 8 is preferably 10 nm or less, and more preferably 5 nm or less.

As the organic photoelectric conversion material capable of satisfying such conditions, for instance, quinacridone-based organic compounds and phthalocyanine-based organic compounds are cited. For instance, since an absorption peak wavelength in the visible light region of quinacridone is 560 nm, in the case where quinacridone is used as an organic photoelectric conversion material and CsI (Ti) is used as a material for the phosphor layer 8, the difference in the peak wavelengths can be set at 5 nm or less, and thereby, an amount of electric charges generated in the photoelectric conversion layer 4 can be substantially maximized.

Hereinafter, the photoelectric conversion layer 4 which can be used in the radiation imaging element of the invention is to be described more specifically.

An electromagnetic wave absorption/photoelectric conversion site in the radiation imaging element of the invention is constituted of a pair of electrodes 2 and 6 and an organic layer containing an organic photoelectric conversion layer 4 between the electrodes 2 and 6. The organic layer may be formed, more specifically, by stacking or mixing a site that absorbs an electromagnetic wave, a photoelectric conversion site, an electron transporting site, a hole transporting site, an electron blocking site, a hole blocking site, a crystallization inhibition site, electrodes, an interlayer contact improvement site or the like.

The organic layer preferably contains an organic p-type compound or an organic n-type compound.

The organic p-type semiconductor (compound) is a donor type organic semiconductor (compound) which is mainly represented by a hole transporting organic compound, and an organic compound which has an electron-donating property. In more detail, when two organic materials are used in contact together, the one that is smaller in ionization potential is the organic p-type semiconductor (compound). Accordingly, as the donor type organic compound, any organic compounds may be used as far as it has an electron-donating property. Specific examples thereof include triarylamine compounds, benzidine compounds, pyrazoline compounds, styrylamine compounds, hydrazone compounds, triphenylmethane compounds, carbazole compounds, polysilane compounds, thiophene compounds, phthalocyanine compounds, cyanine compounds, merocyanine compounds, oxonol compounds, polyamine compounds, indole compounds, pyrrole compounds, pyrazole compounds, polyarylene compounds, condensed aromatic carbocyclic compounds (naphthalene derivatives, anthracene derivatives, phenanthrene derivatives, tetracene derivatives, pyrene derivatives, perylene derivatives and fluoranthene derivatives), metal complexes having a nitrogen-containing heterocyclic compound as a ligand and the like. Without restricting thereto, an organic compound having smaller ionization potential than that of an organic compound used as the n-type (acceptor type) compound may be used as a donor type organic semiconductor.

The organic n-type semiconductor (compound) is an acceptor type organic semiconductor (compound) which is mainly represented by an electron transporting organic compound, and an organic compound which has an electron-accepting property. In more detail, when two organic compounds are used in contact together, the organic n-type semiconductor (compound) means the one that is larger in electron affinity. Accordingly, as the acceptor type organic compound, any organic compound may be used, as far as it has an electron-receiving property. Specific examples thereof include condensed aromatic carbocyclic compounds (naphthalene derivatives, anthracene derivatives, phenanthrene derivatives, tetracene derivatives, pyrene derivatives, perylene derivatives and fluoranthene derivatives), 5 to 7-membered heterocyclic compounds containing nitrogen atom, oxygen atom or sulfur atom (such as pyridine, pyrazine, pyrimidine, pyridazine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazole, benzothiazole, carbazole, purine, triazolopyridazine, triazolopyrimidine, tetrazaindene, oxadiazole, imidazopyridine, pyralidine, pyrrolopyridine, thiadiazolopyridine, dibenzazepine, tribenzazepine and the like), polyarylene compounds, fluorene compounds, cyclopentadiene compounds, silyl compounds, metal complexes having a nitrogen-containing heterocyclic compound as a ligand and the like. Without restricting thereto, as far as it is an organic compound larger in electron affinity than organic compounds used as the donor type organic compounds, it may be used as an acceptor type organic semiconductor.

As a p-type organic dye or n-type organic dye, known dyes may be used. Preferable examples thereof include cyanine dyes, styryl dyes, hemicyanine dyes, merocyanine dyes (including zeromethine merocyanine (simple merocyanine)), trinuclear merocyanine dyes, tetranuclear merocyanine dyes, rhodacyanine dyes, complex cyanine dyes, complex merocyanine dyes, alopolar dyes, oxonol dyes, hemioxonol dyes, squalium dyes, croconium dyes, azamethine dyes, coumarin dyes, arylidene dyes, antiaquinone dyes, triphenylmethane dyes, azo dyes, azomethine dyes, spiro compounds, metallocene dyes, fluorenone dyes, flugide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, quinophthalone dyes, phenoxazine dyes, phthaloperylene dyes, porphyrin dyes, chlorophyll dyes, phthalocyanine dyes, metal complex dyes, condensed aromatic carhocyclic dyes (such as naphthalene derivatives, anthracene derivatives, phenanthrene derivatives, tetracene derivatives, pyrene derivatives, perylene derivatives, and fluoranthene derivatives) and the like.

Next, the metal complex compound is to be described. The metal complex compound is a metal complex having a ligand containing at least one of a nitrogen atom, an oxygen atom or a sulfur atom which coordinates to a metal. Though a metal ion in the metal complex is not particularly restricted, specific example thereof preferably include a beryllium ion, a magnesium ion, an aluminum ion, a gallium ion, a zinc ion, an indium ion, and a tin ion, more preferably a beryllium ion, an aluminum ion, a gallium ion, and a zinc ion, and further preferably an aluminum ion and a zinc ion. As the ligand that is contained in the metal complex, there are various known ligands. Specific examples thereof include ligands that are described in H. Yersin, "Photochemistry and Photophysics of Coordination Compounds", Springer-Verlag, 1987 and Akio Yamamoto, "Organometallic Chemistry-Principles and Applications", Shokabo Publishing Co., Ltd., 1982.

The ligand is preferably a nitrogen-containing heterocyclic ligand (having preferably 1 to 30 carbon atoms, more preferably 2 to 20 carbon atoms, and particularly preferably 3 to 15 carbon atoms, which may be a monodentate ligand or a bi- or higher-dentate ligand, and a bidentate ligand is preferable. Specific examples thereof include a pyridine ligand, a bipyridyl ligand, a quinolinol ligand, a hydroxyphenylazole ligand (such as a hydroxyphenylbenzimidazole ligand, a hydroxyphenylbenzoxazole ligand, or a hydroxyphenylimidazole ligand), an alkoxy ligand (having preferably 1 to 30 carbon atoms, more preferably 1 to 20 carbon atoms, and even more preferably 1 to 10 carbon atoms; for example, methoxy, ethoxy, butoxy, 2-ethylhexyloxy or the like), an aryloxy ligand (having preferably 6 to 30 carbon atoms, more preferably 6 to 20 carbon atoms, and even more preferably 6 to 12 carbon atoms; for example, phenyloxy, 1-naphthyloxy, 2-naphthyloxy, 2,4,6-trimethylphenyloxy, 4-biphenyloxy or the like), a heteroaryloxy ligand (having preferably 1 to 30 carbon atoms, more preferably 1 to 20 carbon atoms, and even more preferably 1 to 12 carbon atoms, for example, pyridyloxy, pyrazinyloxy, pyrimidyloxy, quinolyloxy or the like), an alkylthio ligand (having preferably 1 to 30 carbon atoms, more preferably 1 to 20 carbon atoms, and even more preferably 1 to 12 carbon atoms; for example, methylthio, ethylthio and the like), an arylthio ligand (having preferably 6 to 30 carbon atoms, more preferably 6 to 20 carbon atoms, and even more preferably 6 to 12 carbon atoms; for example phenylthio or the like), a heterocycle-substituted thio ligand (having preferably 1 to 30 carbon atoms, more preferably 1 to 20 carbon atoms, and even more preferably 1 to 12 carbon atoms; for example, pyridylthio, 2-benzimidazolylthio, 2-benzoxazolylthio, 2-benzothiazolylthio or the like), or a siloxy ligand (having preferably 1 to 30 carbon atoms, more preferably 3 to 25 carbon atoms, and even more preferably from 6 to 20 carbon atoms; for example, a triphenylsiloxy group, a triethoxysiloxy group, a triisopropylsiloxy group or the like), more preferably a nitrogen-containing heterocyclic ligand, an aryloxy ligand, a heteroaryloxy ligand or a siloxy ligand, and even more preferably a nitrogen-containing heterocyclic ligand, an aryloxy ligand or a siloxy ligand.

In the invention, it is preferred that a photoelectric conversion layer (photosensitive layer) which is disposed between a pair of electrodes has a p-type semiconductor layer and an n-type semiconductor layer, wherein at least one of the p-type semiconductor or the n-type semiconductor is an organic semiconductor, and has a bulk heterojunction structure layer containing the p-type semiconductor and the n-type semiconductor as an intermediate layer between the semiconductor layers. Thus, by containing the bulk heterojunction structure layer in a photoelectric conversion layer, a drawback that a carrier diffusion length of an organic layer is short is compensated, and thereby the photoelectric conversion efficiency can be improved. The bulk heterojunction structure is described in detail in JP-A No. 2005-303266 (U.S. Patent Application No. 20050205903A1).

Furthermore, in the invention, the photoelectric conversion layer (photosensitive layer), which is disposed between a pair of electrodes, preferably has a structure which has two or more of a repeating structure (tandem structure) of a pn junction layer formed of the p-type semiconductor layer and the n-type semiconductor layer, and more preferably has a thin layer made of an electrically conductive material disposed between the repeating structures. The number of the repeating structure (tandem structure) of a pn junction layer is not particularly restricted. From the viewpoint of improving photoelectric conversion efficiency, the number of the repeating structure of a pn junction layer is preferably from 2 to 50, more preferably from 2 to 30, and even more preferably from 2 to 10. The electrically conductive material is preferably silver or gold, and most preferably silver. The tandem structure is described in detail in JP-A No. 2005-303266 (U.S. Patent Application No. 20050205903A1).

Furthermore, in the invention, in the case where the photoelectric conversion layer which is disposed between a pair of electrodes, has a layer of a p-type semiconductor and a layer of an n-type semiconductor, and preferably has further a mixed and dispersed (bulk heterojunction structure) layer thereof, the photoelectric conversion layer preferably contains an orientation-controlled organic compound which has an orientation controlled in a particular direction as at least one of the p-type semiconductor or the n-type semiconductor, and more preferably contains an orientation-controlled or orientation controllable organic compound in both the p-type semiconductor and the n-type semiconductor. The organic compound contained in an organic layer of the photoelectric conversion layer is preferably an organic compound having a π-conjugated electron, and more preferably the π-electron plane thereof is not vertical to a substrate (electrode substrate), but is oriented at an angle close to parallel to the substrate as far as possible. The angle to the substrate is preferably from 0° to 80°, more preferably from 0° to 60°, further preferably from 0° to 40°, still further preferably from 0° to 20°, particularly preferably from 0° to 10°, and most preferably 0° (namely, parallel to the substrate). As described above, a layer of the orientation-controlled organic compound may be a layer, wherein the orientation-controlled organic compound is contained at least in part in an entire organic layer. Preferably, a ratio of an orientation-controlled portion with respect to an entire organic layer is 10% or more, more preferably 30% or more, further more preferably 50% or more, still further more preferably 70% or more, particularly preferably 90% or more, and most preferably 100%. In such a condition, by controlling the orientation of the organic compound in the organic layer of the photoelectric conversion layer, a drawback that the organic layer has a short carrier diffusion length is compensated, and thereby, the photoelectric conversion efficiency is improved.

In the case where the orientation of an organic compound is controlled, the heterojunction plane (for example, a pn junction plane) is preferably not in parallel to a substrate. More preferably, the heterojunction plane is not in parallel to the substrate (electrode substrate) but is oriented at an angle close to verticality to the substrate. An angle to the substrate is preferably from 10° to 90°, more preferably from 30° to 90°, further more preferably from 50° to 90°, still further preferably from 70° to 90°, particularly preferably from 80° to 90°, and most preferably 90° (namely, vertical to the substrate). A layer of the organic compound in which the heterojunction plane is controlled organic compound such as mentioned above may be contained at least in part in an entire organic layer. A ratio of the orientation-controlled portion with respect to the entire organic layer is preferably 10% or more, more preferably 30% or more, further preferably 50% or more, still further preferably 70% or more, particularly preferably 90% or more, and most preferably 100%. In such a condition, an area of the heterojunction plane in the organic layer increases, and an amount of carriers such as electrons, holes and pairs of an electron and a hole generated at an interface increases to enable to improve the photoelectric conversion efficiency. In the photoelectric conversion element in which the orientation of both the heterojunction plane and the n-electron plane of the organic compound is controlled, the photoelectric conversion efficiency may be particularly improved. These conditions are described in detail in JP-A No. 2006-086493 (U.S. Patent Application No. 20050205903A1).

From the viewpoint of absorbing light from the phosphor layer 8, a thickness of the photoelectric conversion layer 4 is preferably as thick as possible. However, taking into consideration of a ratio that does not contribute to a charge separation, the thickness is preferably from 30 nm to 300 nm, more preferably from 50 nm to 250 mm, and even more preferably from 80 nm to 200 nm.

In the radiation imaging element 12 shown in FIG. 4, the photoelectric conversion layer 4 is formed in one sheet common over all pixel portions. However, it may be divided for each of pixel portions.

The lower electrode 2 is a thin film divided for every pixel. The lower electrode 2 may be formed by a transparent or non-transparent electrically conductive material, and preferably, aluminum, silver or the like is preferably used.

A thickness of the lower electrode 2 can be, for instance, from 30 nm to 300 nm.

In the photoelectric conversion portion 13, when a predetermined bias voltage is applied between the upper electrode 6 and the lower electrode 2, one of electric charges (a hole or an electron) generated in the photoelectric conversion layer 4 is transported to the upper electrode 6 and the other is transported to the lower electrode 2. In the radiation imaging element 12 according to the embodiment of the invention, a wiring is connected to the upper electrode 6 and a bias voltage is applied to the upper electrode 6 through the wiring. The polarity of a bias voltage is determined so that electrons generated in the photoelectric conversion layer 4 are transported to the upper electrode 6 and holes are transported to the lower electrode 2. However, the polarity may be reversed.

The photoelectric conversion portion 13 that constitutes each of the pixel portions contains at least a lower electrode 2, a photoelectric conversion layer 4 and an upper electrode 6. However, in order to inhibit a dark current from increasing, at least one of an electron blocking layer 3 and a hole blocking layer 5 is preferably disposed, and more preferably both of them are disposed.

The electron blocking layer 3 may be disposed between the lower electrode 2 and the photoelectric conversion layer 4, and when a bias voltage is applied between the lower electrode 2 and the upper electrode 6, the electron blocking layer 3 can inhibit an injection of electrons from the lower electrode 2 to the photoelectric conversion layer 4 which increases the dark current.

The electron blocking layer 3 may include electron-donating organic materials. Specific examples thereof include low molecular weight materials which include aromatic diamine compounds such as N,N'-bis(3-methylphenyl)-(1,1'-biphenyl)-4,4'-diamine (TPD), 4,4'-bis[N-(naphthyl)-N-phenylamino]biphenyl (α-NPD) and the like, oxazole, oxadiazole, triazole, imidazole, imidazolone, stilbene derivatives, pyrazoline derivatives, tetrahydroimidazole, polyarylalkane butadiene, 4,4',4"-tris(N-(3-methylphenyl)N-phenylamino)triphenylamine (m-MTDATA), porphilin compounds such as porphin, tetraphenyl porphin copper, phthalocyanine, and copper phthalocyanine, titanium phthalocyanine oxide and the like, triazole derivatives, oxadiazole derivatives, imidazole derivatives, polyaryl alkane derivatives, pyrazoline derivatives, pyrazolone derivatives, phenylene diamine derivatives, arylamine derivatives, amino-substituted chalcone derivatives, oxazole derivatives, styryl anthracene derivatives, fluorenone derivatives, hydrazone derivatives, silazane derivatives and the like, and high molecular weight materials including polymers of phenylene vinylene, fluorene, carbazole, indole, pyrene, pyrrole, picoline, thiophene, acetylene, diacetylene and the like, and derivatives thereof.

A material that is actually used in the electron blocking layer 3 is selected depending on a material of the adjacent electrode and a material of the adjacent photoelectric conversion layer 4. Preferable is a material having an electron affinity (Ea) larger by 1.3 eV or more than a work function (Wf) of a material of the adjacent electrode, and having an ionization potential (Ip) same as or smaller than an Ip of a material of the adjacent photoelectric conversion layer 4.

A thickness of the electron blocking layer 3 is preferably from 10 nm to 200 mm, more preferably from 30 nm to 150 nm, and even more preferably from 50 nm to 100 nm in order to assuredly exert a dark current inhibition effect and to prevent deterioration in the photoelectric conversion efficiency of the photoelectric conversion portion 13.

The hole blocking layer 5 may be disposed between the photoelectric conversion layer 4 and the upper electrode 6. When a bias voltage is applied between the lower electrode 2 and the upper electrode 6, the hole blocking layer 5 has a function to inhibit an injection of holes from the upper electrode 6 to the photoelectric conversion layer 4 which increases a dark current.

The hole blocking layer 5 may include electron-accepting organic materials. Specific examples of the electron-accepting materials include fullerenes or carbon nano-tubes including C60, C70 or the like and derivatives thereof; oxadiazole derivatives such as 1,3-bis(4-tert-butylphenyl-1,3,4-oxadiazolyl)phenylene (OXD-7) and the like; anthraquinodimethane derivatives; diphenylquinone derivatives; bathocuproine, bathophenanthroline, and derivatives thereof; triazole compounds; tris(8-hydroxyquinolinato)aluminum complex; bis(4-methyl-8-quinolinato)aluminum complex; distyrylarylene derivatives; silol compounds; and the like.

A thickness of the hole blocking layer 5 is preferably from 10 nm to 200 nm, more preferably from 30 nm to 150 nm, and even more preferably from 50 nm to 100 nm in order to assuredly exert a dark current inhibition effect and to prevent the deterioration in the photoelectric conversion efficiency of the photoelectric conversion portion 13.

A material that is actually used in the hole blocking layer 5 is selected depending on a material of the adjacent electrode and a material of the adjacent photoelectric conversion layer 4. The material preferably has an ionization potential (Ip) larger by 1.3 eV or more than a work function (Wf) of a material of the adjacent electrode, and has an electron affinity (Ea) same as or larger than an Ea of a material of the adjacent photoelectric conversion layer 4.

When a bias voltage is set so that, among electric charges generated in the photoelectric conversion layer 4, holes are transported to the upper electrode 6 and electrons are transported to the lower electrode 2, a configuration of the electron blocking layer 3 and the hole blocking layer 5 is made to be reversed. Furthermore, both the electron blocking layer 3 and the hole blocking layer 5 are not necessarily disposed. When any one of them is disposed, the dark current inhibition effect can be obtained to some extent.

In the invention, the photoelectric conversion material used in the photoelectric conversion layer is not limited to an organic material, and an inorganic material such as amorphous Si, an amorphous oxide or the like can be used.

<Signal Output Portion>

A signal output portion 14 is formed on a surface of the substrate 1 below the lower electrode 2 of the respective pixel portions. FIG. 4 schematically shows a configuration of the signal output portion 14. Corresponding to the lower electrode 2, a capacitor 9 that storages electric charges transported to the lower electrode 2 and a field effect thin film transistor (hereinafter, in some cases, simply referred to as thin film transistor) 10 that converts electric charges stored in the capacitor 9 to a voltage signal and outputs the voltage signal are formed. A region where the capacitor 9 and the thin film transistor 10 are formed is partially overlapped with the lower electrode 2 in a plane view. When thus configured, the signal output portion 14 and the photoelectric conversion portion 13 overlap each other in a thickness direction in the respective pixel portions. In order to minimize a plane area of the radiation imaging element 12 (pixel portion), a region where the capacitor 9 and the thin film transistor 10 are formed is preferably completely covered by the lower electrode 2.

The capacitor 9 is electrically connected to a corresponding lower electrode 2 through a wiring of an electrically conductive material formed passing through an insulating film 11 disposed between the substrate 1 and the lower electrode 2. Thereby, electric charges collected by the lower electrode 2 are transported to the capacitor 9.

<Thin Film Field Effect Transistor Portion>

The thin film field effect transistor (hereinafter, sometimes referred to as a "TFT") of the invention is an active device which has at least a gate electrode, a gate insulating layer, an active layer, a source electrode and a drain electrode in this order, and has the function of switching current between the source electrode and the drain electrode, in which the current passing through the active layer is controlled by applying voltage to the gate electrode. As the TFT structure, either of a stagger structure (hereinafter, sometimes referred to as a top gate structure) and a reversed stagger structure (hereinafter, sometimes referred to as a bottom gate structure) may be formed.

The TFT in the invention includes at least an electric resistance layer and an active layer which has a higher electric resistance than the electric resistance layer, wherein the electric resistance layer is positioned so as to be electrically connected between the active layer and at least one of the source electrode or the drain electrode.

FIG. 1 is a schematic sectional view showing the structure of the preferable embodiment of the invention, wherein at least the electric resistance layer and the active layer are laminated on the substrate, and the active layer is in contact with the gate insulating layer, and the electric resistance layer is in contact with at least one of the source electrode or the drain electrode.

Further, it is preferable in view of improvement in operation stability that the electric resistance layer is thicker than the active layer. Preferably, a ratio of the thickness of the electric resistance layer to that of the active layer is more than 1 and 100 or less, and even more preferably the ratio is more than 1 and 10 or less.

Also, another embodiment in which an electric conductivity continuously changes in the active layer between the electric resistance layer and the active layer is preferable.

Preferably, the active layer has an oxygen concentration lower than that of the electric resistance layer.

Preferably, the active layer and the electric resistance layer include an oxide semiconductor. Preferably, the oxide semiconductor is an amorphous oxide semiconductor selected from the group consisting of indium (In), gallium (Ga) and zinc (Zn), or a composite oxide thereof. More preferably, the oxide semiconductor includes indium and zinc, and a composition ratio of zinc (Zn) to indium (In), i.e., Zn/In, in the electric resistance layer is larger than that in the active layer. The ratio of Zn/In of the electric resistance layer is preferably larger than that of the active layer by 3% or more, and more preferably larger by 10% or more.

Preferably, a ratio of the electric conductivity of the active layer to the electric conductivity of the electric resistance layer (i.e., electric conductivity of active layer/electric conductivity of electric resistance layer) is from $10^1$ to $10^{10}$, and more preferably, from $10^2$ to $10^8$.

Preferably, the electric conductivity of the active layer is $10^{-4}$ Scm$^{-1}$ or more and less than $10^2$ Scm$^{-1}$, and more preferably $10^{-1}$ Scm$^{-1}$ or more and less than $10^2$ Scm$^{-1}$. The electric conductivity of the electric resistance layer is lower than that of the active layer, and is preferably $10^{-2}$ Scm$^{-1}$ or less, and more preferably $10^{-9}$ Scm$^{-1}$ or more and less than $10^{-3}$ Scm$^{-1}$.

In the case where the electric conductivity of the active layer is less than $10^{-4}$ Scm$^{-1}$, high field effect mobility can not be obtained. On the contrary, in the case where the electric conductivity of the active layer is $10^2$ Scm$^{-1}$ or more, OFF current is increased, and thus a good ON-OFF ratio cannot be obtained. Therefore, these conditions are not preferable.

1) Structure

Next, the structure of the thin film field effect transistor according to the invention will be described in detail with reference to the drawings.

FIG. 1 is a schematic sectional view showing an example of the reversed stagger structure of the thin film field effect transistor of the invention. In the case where a substrate 100 is composed of a flexible substrate such as a plastic film or the like, the thin film field effect transistor has an insulating layer 106 disposed on one surface of the substrate 100, and on the insulating layer 106, a gate electrode 102, a gate insulating layer 103, an active layer 104-1, and an electric resistance layer 104-2 are stacked. On the surface of the structure thus constructed, a source electrode 105-1 and a drain electrode 105-2 are disposed. The active layer 104-1 is in contact with the gate insulating layer 103, and the electric resistance layer 104-2 is in contact with the source electrode 105-1 and the drain electrode 105-2. The compositions of the active layer 104-1 and electric resistance layer 104-2 are determined so that the electric conductivity of the active layer 104-1 is higher than that of the electric resistance layer 104-2 when no voltage is applied to the gate electrode.

For the active layer and the electric resistance layer, oxide semiconductors disclosed in JP-A No. 2006-165530 are used, for example, the oxide semiconductor In—Ga—Zn—O based oxide semiconductors. An amorphous oxide semiconductor is more preferable. For example, oxides containing at least one of In, Ga and Zn (for example, such as In—O group) are preferable, oxides containing at least two of In, Ga and Zn (for example, such as In—Zn—O group, In—Ga group, or Ga—Zn—O group) are more preferable, and oxides containing In, Ga and Zn are particularly preferable. As In—Ga—Zn—O amorphous oxides, amorphous oxides having a composition expressed by $InGaO_3 (ZnO)_m$ (m: a natural number less than 6) in a crystalline state are preferred, and in particular, $InGaZnO_4$ is more preferred. It is known that in these oxide semiconductors, the higher the concentration of electron carriers is, the higher the electron mobility is. In other words, the higher the electric conductivity is, the higher the electron mobility is.

According to this structure of the invention, when the thin film field effect transistor in the ON state under the condition where voltage is applied to the gate electrode, the active layer which becomes a channel has high electric conductivity. As a result, the field effect mobility of the transistor is increased and a large ON current can be obtained. On the other hand, in the OFF state, the electric resistance layer has a high resistance because of its low electric conductivity, and the OFF current is kept low. Thus, the ON-OFF ratio is remarkably improved.

Figure 2:
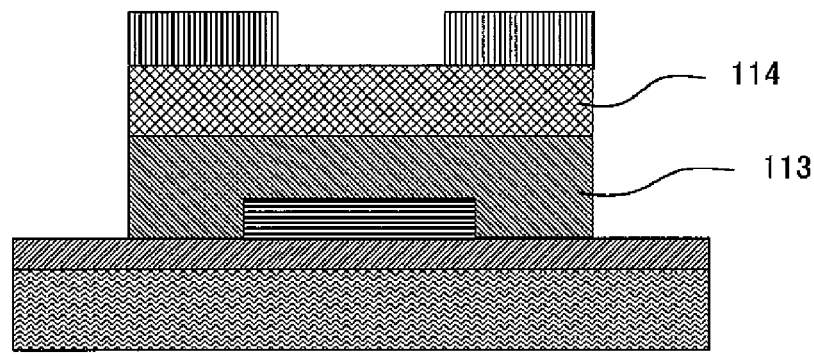
FIG. 2 is a schematic sectional view showing the structure of a conventional field-effect transistor.

FIG. 2 is a schematic sectional view showing an example of a conventional thin film field effect transistor with a reversed stagger structure. The active layer 114 has no particular distribution of the electric conductivity in the direction of its thickness. With the conventional arrangement, the resistance value of the active layer 114 needs to be lowered to reduce OFF current, and it is required to decrease the carrier concentration of the active layer 114. JP-A No. 2006-165530 discloses that to achieve a good ON-OFF ratio, the concentration of electron carriers needs to be made less than $10^{18}/cm^3$, and more preferably less than $10^{16}/cm^3$ for reducing the electric conductivity of the amorphous oxide semiconductor of the active layer 114. However, as shown in FIG. 2 of JP-A No. 2006-165530, in In—Ga—Zn—O-based oxide semiconductors, a decrease in the concentration of electron carriers causes reduced electron mobility of the film. On this account, a field effect mobility of the TFT of 10 $cm^2/Vs$ or higher cannot be obtained, and it is impossible to gain a sufficient ON current. Therefore, as to the ON-OFF ratio, sufficient characteristics cannot be obtained.

On the other hand, raising the concentration of electron carriers of the oxide semiconductor of the active layer 114 to increase the electron mobility of the film increases the electric conductivity of the active layer 114, increases the OFF current, and worsens the characteristics of ON-OFF ratio.

Although it is not shown in the drawing, the point of the invention is to provide a structure, wherein a semiconductor layer including an active layer and an electric resistance layer is electrically connected between a gate electrode and at least a source electrode or a drain electrode, whose electric conductivity near the gate insulating layer is higher than that near the source electrode and the drain electrode. As long as this condition is achieved, the means for achieving this is not limited to providing a plurality of semiconductor layers each including an active layer and an electric resistance layer as shown in FIG. 1. The electric conductivity of the semiconductor layer may change continuously.

Figure 3:
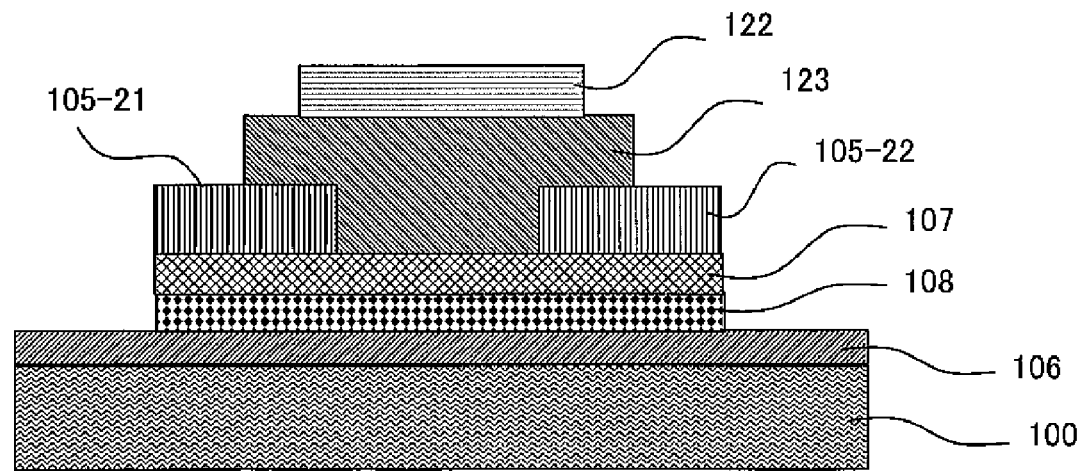
FIG. 3 is a schematic sectional view showing the structure of another conventional field-effect transistor.

FIG. 3 is a schematic sectional view showing an example of the structure of a thin film field effect transistor with top gate structure for comparison. It is the structure disclosed in JP-A No. 2006-165530. An active layer is composed of a high-oxygen-concentration layer 107 and a low-oxygen-concentration layer 108. The high-oxygen-concentration layer 107 is a layer with a low electron carrier concentration, i.e., a layer with low electric conductivity. The low-oxygen-concentration layer 108 is a layer with a high electron carrier concentration, i.e., a layer with high electric conductivity. In this structure for comparison, the active layer bordering the gate insulating layer 123, which becomes a channel, is low in both electron carrier concentration and electron mobility. Therefore, the structure cannot achieve high field effect mobility.

<Method for Producing Radiation Imaging Element 12>

In the next place, a method of producing the radiation imaging element 12 according to the embodiment of the invention is to be described.

In the invention, both the amorphous oxide that constitutes the semiconductor layer 24 of the thin film transistor 10 and the organic photoelectric conversion material that constitutes the photoelectric conversion layer 4 can be deposited at a low temperature. Accordingly, the substrate 1 is not limited to substrates having high heat resistance such as a semiconductor substrate, a quartz substrate, a glass substrate or the like, but includes flexible substrates such as plastics or the like. Specific examples thereof include flexible substrates such as polyesters such as polyethylene terephthalate, polybutylene phthalate, polyethylene naphthalate and the like, polystyrene, polycarbonate, polyether sulfone, polyarylate, polyimide, polycycloolefin, norbornene resin, and poly(chlorotrifluoroethylene) and the like. The use of the plastic flexible substrate realizes weight reduction, which results in, for example, an advantage in transportation.

Furthermore, on the substrate 1, an insulating layer for securing the insulating property, a gas barrier layer for inhibiting moisture and oxygen from permeation, or an undercoat layer for improving flatness or adhesiveness with an electrode may be disposed.

On the substrate 1, if necessary, the insulating layer is formed, and thereafter, the signal output portion 14 is formed.

In the thin film transistor 10 which composes a signal output portion 14, a gate electrode 22, a gate insulating layer 23 and a semiconductor layer 24 are laminated, and on the semiconductor layer 24, a source electrode 25 and a drain electrode 26 are disposed with a predetermined separation. In the radiation imaging element 12 of the invention, the semiconductor layer 24 is composed of an amorphous oxide.

When the semiconductor layer 24 of the thin film transistor 10 is formed of an amorphous oxide, radiation such as X-rays is not absorbed or only slightly absorbed, and thereby, noise in the signal output portion 14 is effectively inhibited.

The thin film transistor 10 and capacitor 9 are formed, for example, according to a method such as described below.

On the insulating substrate 1, for instance, Mo is deposited by sputtering, and thereafter, a gate electrode 22 is formed by patterning by means of photolithography. In this process, a lower electrode 31 of the capacitor 9 is simultaneously patterned.

Preferable examples of the materials that form the gate electrode 22 include metals such as Al, Mo, Cr, Ta, Ti, Au, Ag and the like; alloys such as Al—Nd, APC and the like; electrically conductive metal oxide films such as tin oxide, zinc oxide, indium oxide, indium tin oxide (ITO), indium zinc oxide (IZO) and the like; organic electrically conductive compounds such as polyaniline, polythiophene, polypyrrole and the like; and mixtures thereof.

A thickness of the gate electrode 22 is preferably from 10 nm to 1000 nm.

In the next place, $SiO_2$ or the like is deposited by sputtering to form a gate insulating layer 23. Examples of materials that form the gate insulating layer 23 include insulators such as $SiO_2$, $SiN_x$, SiON, $Al_2O_3$, $Y_5O_3$, $Ta_2O_5$, $HfO_2$ and the like, and mixed crystal compounds containing at least two of these compounds. Furthermore, a polymer insulator such as polyimide may be used as the gate insulating layer 23.

Furthermore, on the gate insulating layer 23, a semiconductor layer 24 is formed by using, for instance, a polycrystalline sintered body having a composition of $InGaZnO_4$ as a target to deposit an IZGO layer by sputtering. Since an amorphous oxide semiconductor (IZGO layer) is deposited at a low temperature, even when a flexible resin substrate such as plastics is used, without deforming the substrate due to heating, the deposition may be carried out. Further, the electric conductivity of an oxide semiconductor layer formed by an amorphous oxide semiconductor (IGZO layer) can be controlled by adjusting the partial pressure of oxygen during the time of spattering. For example, while the partial pressure of oxygen during an initial step of spattering is kept in lower level, and the partial pressure of oxygen during an ending step of spattering is kept in higher level, a region closer to the gate electrode 23 forms an active layer having high electric conductivity, and a region closer to the source/drain electrode forms an electric resistance layer having lower electric conductivity. After the formation of the active layer and the electric resistance layer, the photolithography is applied to pattern to form a semiconductor layer.

After the semiconductor layer 24 is formed, for instance, indium tin oxide (ITO) is deposited by sputtering, followed by, similarly to the patterning of the gate electrode 22, forming a patterned source electrode 25 and drain electrode 26. In this process, an upper electrode 32 of the capacitor 9 is simultaneously patterned so as to connect with the drain electrode 26.

Preferable examples of the materials that form the source electrode 25 and the drain electrode 26 include metals such as Al, Mo, Cr, Ta, Ti, Au, Ag and the like; alloys such as Al—Nd, APC and the like; electrically conductive metal oxide films such as tin oxide, zinc oxide, indium oxide, indium tin oxide (ITO), indium zinc oxide (IZO) and the like; organic electrically conductive compounds such as polyaniline, polythiophene, polypyrrole and the like; and mixtures thereof.

Thicknesses of the source electrode 25 and the drain electrode 26 are preferably from 10 nm to 1000 nm.

Subsequently, as a protective layer (insulating layer) 11, a photosensitive acryl resin is coated on the substrate 1 by use of a spin coater, followed by exposing so that a contact hole may be formed at a predetermined position, further followed by developing processing. Thereby, a protective layer (insulating layer) 11 in which a contact hole is formed can be formed.

In the next place, as a lower electrode 2 in the photoelectric conversion portion 13, for instance, Mo is deposited by sputtering. Subsequently, according to a method similar to the patterning of the gate electrode 22, patterning is applied to form the lower electrode 2 divided for each of the pixel portions. When the lower electrode 2 is divided for every pixel portions, and the photoelectric conversion layer 4, the upper electrode 6 and the phosphor layer 8 each are made common in a plurality of pixel portions arranged on the substrate 1, the production becomes easy and the production cost may be suppressed low.

After the lower electrode 2 is formed, the electron blocking layer, the photoelectric conversion layer 4, the hole blocking layer and the upper electrode 6 are sequentially deposited by using respectively the materials described above. A film forming method is not particularly limited, but by considering the suitability to materials used and so on, a method appropriately selected from among wet methods such as a printing method, a coating method and the like; physical methods such as a vacuum deposition method, a sputtering method, an ion plating method and the like; chemical methods such as a CVD (chemical vapor depositon) method, a plasma CVD method and the like; and the like is used to deposit.

When the photoelectric conversion layer 4 is formed from amorphous silicon, usually, a CVD apparatus is necessary, and thereby the production cost is high. However, in the invention, an organic photoelectric conversion material is used, and thereby the photoelectric conversion layer 4 is readily formed, for instance, by a vacuum deposition method; and accordingly, the production cost can be suppressed low.

After the upper electrode 6 is formed, an insulating layer 7 is formed. The insulating layer 7 is formed as a transparent insulating layer 7 so as to allow light from the phosphor layer 8 to transmit and can be formed from $SiO_2$, SiN or the like.

Then, the phosphor layer 8 is formed. The phosphor layer 8 is, although depending on the radiation, an absorption peak wavelength of the photoelectric conversion layer 4 and so on, when it is applied to an X-ray imaging apparatus, formed from CsI, CsI (Ti) or the like as described above.

In the next place, operations of the radiation imaging element 12 is to be described.

When X-rays are irradiated to a human body and X-rays transmitted through a human body are incident on a phosphor layer 8, light having a wavelength in a range of, for instance from 420 nm to 600 nm is emitted from the phosphor layer 8, and the light is incident on a photoelectric conversion layer 4. Light having a wavelength region of a green color included in the incident light is absorbed by the photoelectric conversion layer 4 to generate electric charges at the place. Holes of the generated electric charges are transported to a lower electrode 2 and stored in a capacitor 9. The holes stored in the capacitor 9 are converted to a voltage signal owing to a thin film transistor 10 and the voltage signal is output. Due to voltage signals obtained from the respective pixel portions, a monochromatic image picturing the inside of a human body is obtained.

The radiation imaging element 12 according to the embodiment of the invention comprises an organic photoelectric conversion material that is easy to control an absorption peak wavelength as a material of a photoelectric conversion layer 4, and thereby, an emission peak wavelength of the phosphor layer 8 and an absorption peak wavelength of the photoelectric conversion layer 4 are made substantially coincided. As a result, the light emitted from the phosphor layer 8 is absorbed without waste and it is effectively inhibited to absorb radiation such as X-rays to generate noise.

In the case where a photoelectric conversion material is not an organic material, for instance, in the case of amorphous silicon, an absorption spectrum thereof is broad, and thereby, a photoelectric conversion portion 13 catches X-ray noise much. In this case, the X-ray noise hardly reaches a signal output portion 14, and even when an amorphous oxide is used in a TFT active layer, the noise reduction effect is hardly obtained. On the other hand, when an organic material is used as a photoelectric conversion material, an absorption spectrum thereof has a sharp peak and the photoelectric conversion portion 13 hardly absorbs the X-ray noise. As the X-ray noise that is not absorbed by the photoelectric conversion portion 13 reaches the signal output portion 14, the TFT active layer tends to catch the X-ray noise. In this process, when a material that constitutes a TFT active layer is not an amorphous oxide, for instance, in the case of amorphous silicon, the X-ray noise that is not absorbed by the photoelectric conversion portion 13 is absorbed by the TFT active layer. Therefore, an advantage of the use of the organic photoelectric conversion material is lost. However, when the TFT active layer is constituted of an amorphous oxide, the signal output portion 14 is effectively inhibited from absorbing the X-ray noise. That is, since the semiconductor layer 24 of the thin film transistor 10 of the signal output portion 14 is constituted of an amorphous oxide, radiation such as X-rays transmitted through the photoelectric conversion portion 13 is hardly absorbed and thereby the noise is effectively inhibited from occurring in the signal output portion 14.

In the invention as described above silicon is not used in the photoelectric conversion layer 4 and the semiconductor layer 24 of the signal output portion 14, but a combination of a photoelectric conversion layer 4 composed of an organic material and a semiconductor layer 24 composed of an amorphous oxide is adopted, and thereby, the X-ray noise is absorbed neither in the photoelectric conversion portion 13 nor in the signal output portion 14. As a result, the noise due to radiation such as X-rays in the photoelectric conversion portion 13 and the signal output portion 14 is largely reduced.

Furthermore, since the signal output portion 14 and photoelectric conversion portion 13 of each of the pixel portions are disposed so as to overlap at least partially in a thickness direction, in comparison with a radiation imaging element where a photoelectric conversion portion 13 and signal output portion 14 are disposed on the same plane, an area per pixel is made smaller and a light receiving area due to the photoelectric conversion portion 13 is made larger. Accordingly, in a radiation imaging element 12 thus configured, the noise due to the radiation or the like in the photoelectric conversion portion 13 and signal output portion 14 is effectively suppressed and a high-definition image can be obtained.

Furthermore, the radiation imaging element 12 according to the embodiment of the invention suppresses the dark current by an electron blocking layer 3 and a hole blocking layer 5 may, and thereby, a higher quality image can be obtained. When the radiation imaging element 12 is applied for a medical filed, an area of an entire pixel portion becomes significantly large, and, in the case where the area is large, it is expected that electric charges injected from the lower electrode 2 and the upper electrode 6 to the photoelectric conversion layer 4 are increased. Accordingly, it is effective to dispose the electron blocking layer 3 and hole blocking layer 5 to inhibit actively the dark current.

Still furthermore, the radiation imaging element 12 according to the embodiment of the invention, after the signal output portion 14 and lower electrode 2 are formed, enable to form the respective constituents by sequentially depositing the respective materials on an entire surface of the substrate. As a result, even when an area of the radiation imaging element 12 is made larger, a fine manufacturing process is not necessitated to increase so much, and thereby, the production thereof is readily carried out.

Symbols used in FIG. 1 to FIG. 5 are explained below.

1: Substrate
2: Lower electrode
3: Electron blocking layer
4: Photoelectric conversion layer
5: Hole blocking layer
6: Upper electrode
7: Transparent insulating layer
8: Phosphor layer
9: Condenser
10: Thin film field-effect transistor
11: Insulating layer
12: Radiation imaging element
13: Photoelectric conversion portion
14: Signal output portion
22: Gate electrode
23: Gate insulating layer
24: Semiconductor layer
25: Source electrode
26: Drain electrode
31: Condenser lower electrode
32: Condenser upper electrode
100: TFT substrate
102, 122: Gate electrode
103, 113, 123: Gate insulating layer
104-1, 114: Active layer
104-2: Electric resistance layer
105-1, 105-21: Source electrode
105-2, 105-22: Drain electrode
106: Insulating layer
107: High-oxygen-concentration layer
108: Low-oxygen-concentration layer The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A radiation imaging element that receives radiation transmitted through a subject and outputs an image signal corresponding to an amount of the radiation, wherein the radiation imaging element comprises a plurality of pixel portions each comprising:

a photoelectric conversion portion having a lower electrode formed on a substrate, a photoelectric conversion layer formed on the lower electrode, and an upper electrode formed on the photoelectric conversion layer;

a phosphor layer formed on the upper electrode;

a field-effect transistor provided at the substrate so as to correspond to the photoelectric conversion portion, for outputting the image signal corresponding to an electric charge generated in the photoelectric conversion layer;

a capacitor that is electrically connected to the lower electrode and the field-effect transistor, wherein the field-effect transistor includes at least a gate electrode, a gate insulating layer, an active layer, and a source electrode and a drain electrode that are separate from the lower electrode, and an electric resistance layer is provided so as to be electrically connected between the active layer and at least one of the source electrode or the drain electrode, wherein at least the active layer and the electric resistance layer are laminated on the substrate, the active layer is in contact with the gate insulating layer, and the electric resistance layer is in contact with at least one of the source electrode or the drain electrode, and wherein the electric resistance layer is thicker than the active layer.

2. The radiation imaging element according to claim 1, wherein an electric conductivity continuously changes between the electric resistance layer and the active layer.

3. The radiation imaging element according to claim 1, wherein the active layer and the electric resistance layer include an oxide semiconductor.

4. The radiation imaging element according to claim 3, wherein the oxide semiconductor comprises an amorphous oxide semiconductor.

5. The radiation imaging element according to claim 3, wherein the active layer has an oxygen concentration lower than that of the electric resistance layer.

6. The radiation imaging element according to claim 3, wherein the oxide semiconductor includes at least one material selected from the group consisting of indium, gallium and zinc, or a composite oxide of a combination of materials selected from the group consisting of indium, gallium and zinc.

7. The radiation imaging element according to claim 6, wherein the oxide semiconductor includes indium and zinc, and a composition ratio of zinc (Zn) to indium (In), i.e., Zn/In, in the electric resistance layer is larger than that in the active layer.

8. The radiation imaging element according to claim 1, wherein an electric conductivity of the active layer is $10^{-4}$ $Scm^{-1}$ or more, and less than $10^2$ $Scm^{-1}$.

9. The radiation imaging element according to claim 8, wherein the electric conductivity of the active layer is $10^{-1}$ $Scm^{-1}$ or more, and less than $10^2$ $Scm^{-1}$.

10. The radiation imaging element according to claim 1, wherein a ratio of an electric conductivity of the active layer to an electric conductivity of the electric resistance layer (i.e., electric conductivity of active layer/electric conductivity of electric, resistance layer) is from $10^1$ to $10^{10}$.

11. The radiation imaging element according to claim 10, wherein the ratio of the electric conductivity of the active layer to the electric conductivity of the electric resistance layer (i.e., electric conductivity of active layer/electric conductivity of electric resistance layer) is from $10^2$ to $10^8$.

12. The radiation imaging element according to claim 1, wherein the substrate is a flexible resin substrate.

13. The radiation imaging element according to claim 1, wherein the substrate is a flexible plastic film.

* * * * *